United States Patent
Nam et al.

(10) Patent No.: US 12,539,928 B2
(45) Date of Patent: Feb. 3, 2026

(54) RUBBER PAD FOR STEEL TRACK

(71) Applicant: DRB INDUSTRIAL CO., LTD., Busan (KR)

(72) Inventors: Yoon Tae Nam, Busan (KR); Jung Ho Park, Busan (KR)

(73) Assignee: DRB INDUSTRIAL CO., LTD., Busan (KR)

( * ) Notice: Subject to any disclaimer, the term of this patent is extended or adjusted under 35 U.S.C. 154(b) by 799 days.

(21) Appl. No.: 17/837,332

(22) Filed: Jun. 10, 2022

(65) Prior Publication Data

US 2022/0402566 A1 Dec. 22, 2022

(30) Foreign Application Priority Data

Jun. 16, 2021 (KR) ........................ 10-2021-0078307

(51) Int. Cl.
*B62D 55/28* (2006.01)
*B62D 55/275* (2006.01)

(52) U.S. Cl.
CPC ........... *B62D 55/28* (2013.01); *B62D 55/275* (2013.01)

(58) Field of Classification Search
CPC .... B62D 55/28; B62D 55/275; B62D 55/088; B62D 55/0887
See application file for complete search history.

(56) References Cited

U.S. PATENT DOCUMENTS

| | | | | |
|---|---|---|---|---|
| 5,630,657 | A | * | 5/1997 | Kumano ................ B62D 55/26 305/192 |
| 2009/0267408 | A1 | | 10/2009 | Chiang |
| 2011/0148187 | A1 | | 6/2011 | Lyons |

FOREIGN PATENT DOCUMENTS

| | | | | |
|---|---|---|---|---|
| CN | 101402376 A | * | 4/2009 | ............ B62D 55/21 |
| DE | 102004013705 A1 | | 10/2005 | |
| EP | 0516128 A1 | | 12/1992 | |
| EP | 3441290 A1 | | 2/2019 | |
| JP | 09-039587 A | | 2/1997 | |
| JP | 11-171057 A | | 6/1999 | |
| JP | 11-180356 A | | 7/1999 | |
| JP | 2004-066997 A | | 3/2004 | |
| KR | 10-2008-0040350 A | | 5/2008 | |
| WO | WO-8100543 A1 | * | 3/1981 | |
| WO | 2014/030927 A1 | | 2/2014 | |

* cited by examiner

*Primary Examiner* — Kip T Kotter
(74) *Attorney, Agent, or Firm* — NKL LAW; Jae Youn Kim

(57) ABSTRACT

Proposed is a rubber pad for a steel track. The rubber pad coupled to the steel track formed by connecting a plurality of links and provided with a bushing engaging with a sprocket to allow driving of equipment may include a rubber pad body coupled to an outside of the link and a bushing cover extending from an outer surface of the pad body toward the adjacent pad body to shield the bushing from the outside, wherein a foreign substance discharging groove having the bushing cover inside may be formed in the pad body.

10 Claims, 10 Drawing Sheets

- Prior Art -

RUBBER PAD FOR STEEL TRACK

CROSS REFERENCE TO RELATED APPLICATION

The present application claims priority to Korean Patent Application No. 10-2021-0078307, filed on Jun. 16, 2021, the entire contents of which is incorporated herein for all purposes by this reference.

BACKGROUND OF THE INVENTION

Field of the Invention

The present invention relates to a rubber pad for a steel track.

Description of the Related Art

Various types of driving devices that drive using tracks have been developed and used. For example, military equipment such as tanks, heavy equipment such as bulldozers, excavators, and the like, and devices such as snowmobiles, multi-terrain loaders, and the like are designed to drive using various types of tracks.

The track driving devices employ various types of tracks. For example, heavy equipment generally employs steel tracks made of metal while light equipment employs rubber tracks made of an elastic material such as rubber. In addition, a rubber pad is mounted on a steel caterpillar track.

The rubber pad has the advantage of the rubber track such as reduced driving vibration, increased ride comfort, and dampened noise, and may prevent damage to the road surface such as pavement during work and driving and expand work areas to pavements inaccessible to the steel track.

However, the rubber pad used in the steel track has a problem of power loss caused by foreign substances that enter into the space surrounded by the pad body bushings, links, and the like, fail to be discharged to the outside and interfere with sprocket driving. In addition, foreign substances stuck in a fastening hole to which a bolt for coupling the rubber pad to the link is fastened make it difficult to disassemble and assemble the bolt during maintenance, and an edge-cut occurring at the boundary of the iron core causes early damage to the tread rubber. The edge-cut refers to a phenomenon in which the rubber at either end in the width direction is damaged when a load is generated by uneven ground or obstacles.

A failure to discharge the deposited foreign substances to the outside leads to early wearing of driving parts such as sprockets, bushings, and the like as well as early wearing and damage to the pad body, and maintenance issues arise.

DOCUMENT OF RELATED ART

Korean Patent Publication No. 10-2008-0040350 (May 8, 2008)

SUMMARY OF THE INVENTION

An object of the present invention is to provide a rubber pad for a steel track configured to facilitate the discharging to the outside of foreign substances entering the vicinity of the driving unit of the steel track.

Another object of the present invention is to provide a rubber pad for a steel track configured to facilitate the separation and discharge of foreign substances stuck in a bolt fastening hole while the steel track drives, thereby improving maintenance efficiency.

Still another object of the present invention is to provide a rubber pad for a steel track having an inclining surface for preventing edge-cutting, thereby facilitating the discharge of foreign substances, cleaning, and maintenance.

According to an embodiment of the present invention, a rubber pad for a steel track coupled to the steel track formed by connecting a plurality of links and provided with a bushing engaging with a sprocket to allow driving of equipment may include a rubber pad body coupled to an outside of the link and one or more foreign substance discharging grooves formed on an outer surface of the pad body and indented in the forward or backward direction of the steel track.

The bottom surface of the foreign substance discharging groove may incline downward from the inside to the outside and either side surface of the foreign substance discharging groove may widen from the inside to the outside.

The rubber pad may be provided on either side with fastening holes to which bolts for coupling the rubber pad to the link are fastened, and the length of the foreign substance discharging groove in the width direction may be equal to or less than the distance between the fastening holes.

A bushing cover extending from the outer surface of the pad body toward the adjacent pad body to shield the bushing from the outside may be further included.

The bushing cover may face the foreign substance discharging groove to be accommodated inside the foreign substance discharging groove.

When the bushing cover is accommodated inside the foreign substance discharging groove, a predetermined interval may be formed between the bushing cover and the foreign substance discharging groove, and the interval may be 3 to 10 mm in length, width, and height directions of the pad body.

The bushing cover may be provided in either the front end or rear end of the pad body with respect to the driving direction of the steel track.

The lower surface 124a of the bushing cover may incline upward from the pad body toward the outside.

According to another embodiment of the present invention, a rubber pad for a steel track coupled to the steel track formed by connecting a plurality of links and provided with a bushing engaging with a sprocket to allow driving of equipment may include a rubber pad body coupled to an outside of the link, wherein a fastening hole to which a bolt for coupling the rubber pad to the link is fastened is formed in the middle of the pad body, and an inner surface of the fastening hole is provided with a step portion having one or more steps to facilitate the removal of foreign substances stuck in the fastening hole.

A fastening portion to which the bolt is substantially fastened may be formed inside the fastening hole, and the fastening portion may be formed adjacent to an inner surface of the fastening hole.

A fastening portion to which the bolt is substantially fastened may be formed inside the fastening hole, and the fastening portion may be formed in the middle of the fastening hole.

A fastening portion to which the bolt is substantially fastened may be formed inside the fastening hole, and an inclining surface connecting an upper end of the fastening portion and an upper end of the fastening hole may be formed.

The inclining surface may radially extend from an upper end of the fastening portion to the upper end of the fastening hole.

According to still another embodiment of the present invention, a rubber pad for a steel track coupled to the steel track formed by connecting a plurality of links and provided with a bushing engaging with a sprocket to allow driving of equipment may include a rubber pad body coupled to the outside of the link and an iron core provided inside the pad body in the right/left width direction, wherein either end of the pad body may be provided with a pad end surface formed in the driving direction of the steel track and a pad inclining surface inclining from the front and rear ends of the pad end surface toward the middle of the pad body.

Either end of the iron core may be provided with an iron core end surface extending in parallel with the pad end surface at a first interval and an iron core inclining surface extending in parallel with the pad inclining surface at a second interval.

The first and second intervals may be 0.5 to 1.5 times the interval between the pad end surface and the iron core end surface formed along the centerline with respect to the driving direction of the pad body.

According to the embodiment of the present invention, discharge of foreign substances entering the vicinity of the driving unit of the steel track to the outside may be facilitated.

In addition, the present invention may facilitate the separation and discharge of foreign substances stuck in a bolt fastening hole while the steel track drives, thereby improving maintenance efficiency.

In addition, the present invention forms an inclining surface, thereby facilitating the discharge of foreign substances, cleaning, and maintenance.

DETAILED DESCRIPTION OF THE INVENTION

Figure 1:
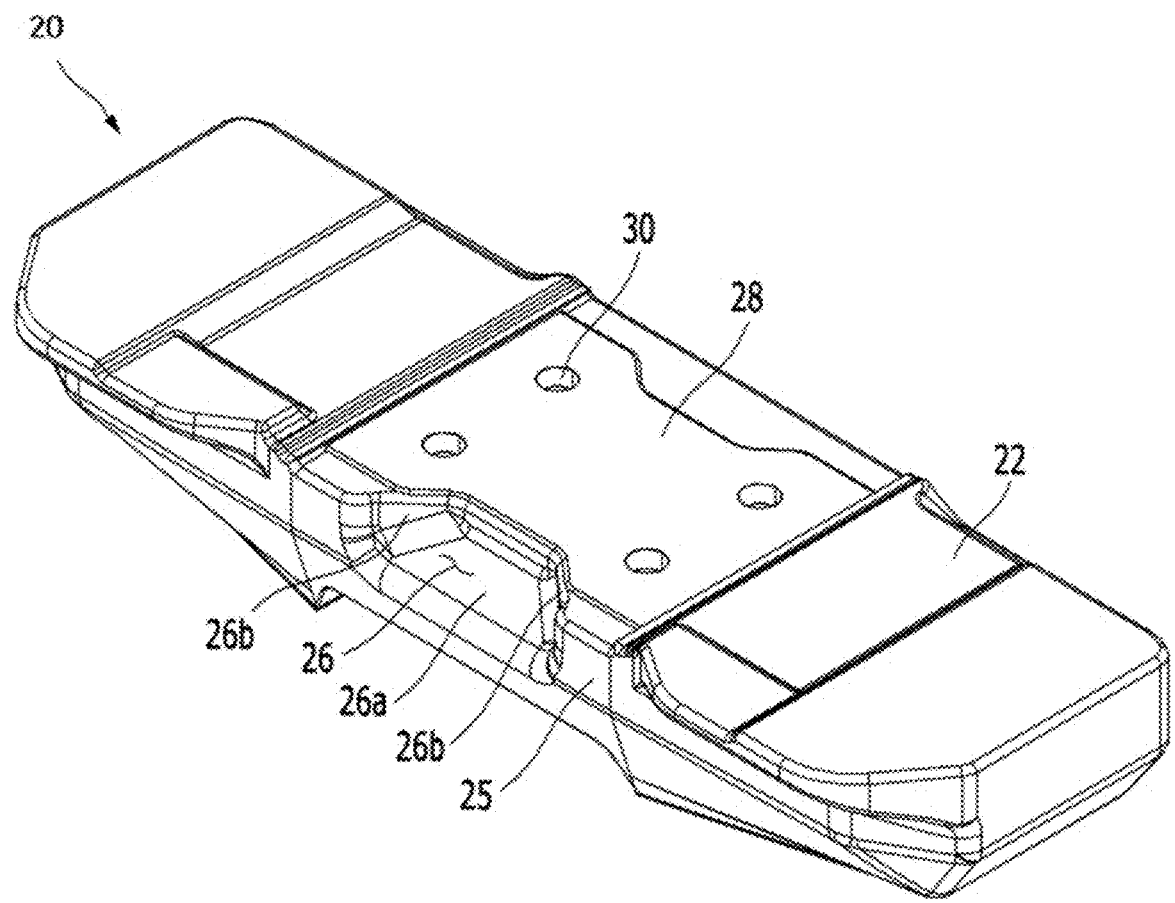
FIG. 1 is a perspective view illustrating a rubber pad according to an embodiment of the present invention.

Since the present invention may be modified in various ways and have various embodiments, specific embodiments will be illustrated in the drawings and described. However, this is not intended to limit the present invention to the specific embodiments and should be construed as including all modifications, equivalents, and substitutes included in the spirit and technical scope of the present invention. When it is determined that a detailed description of a known technology in the related art may obscure the gist of the present invention, the detailed description will be omitted in the description of the present invention.

Terms such as first, second, etc. may be used to describe various components, but the components are not to be limited by the terms. The terms may only be used to distinguish one component from another.

The terms used in the present specification are only used to describe specific embodiments and are not intended to limit the present invention. Singular expressions include plural expressions unless the context explicitly indicates otherwise. In the present specification, terms such as "comprise" or "have" are intended to designate the presence of implemented features, numbers, steps, actions, components, parts, or combinations thereof and should not be understood to preclude the presence or additional possibilities of one or more of other features, numbers, steps, actions, components, parts or combinations thereof in advance.

Hereinafter, the embodiments of a rubber pad for a steel track will be described in detail with reference to the accompanying drawings. In describing with reference to the accompanying drawings, the same or corresponding components will be assigned the same reference numerals, and the repetitive description thereof will be omitted.

Figure 2:
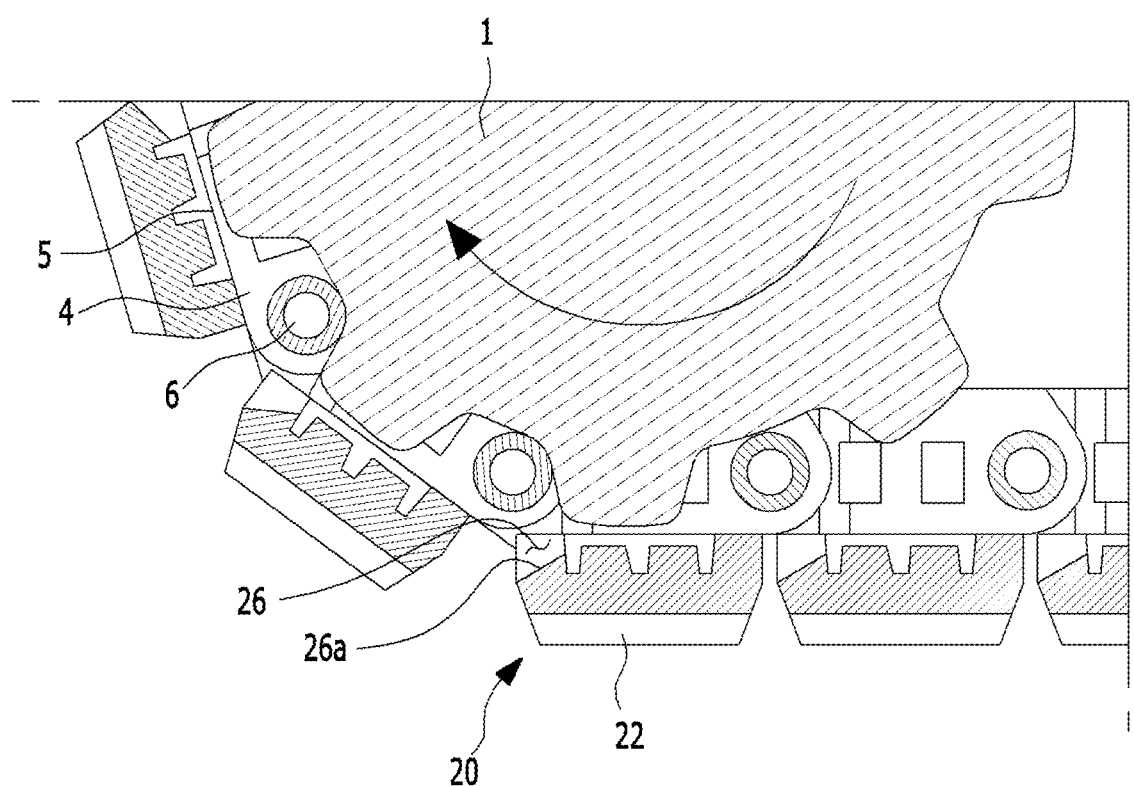
FIG. 2 is a cross-sectional view of the rubber pad in FIG. 1 mounted on a steel track.

FIG. 1 is a perspective view illustrating a rubber pad according to an embodiment of the present invention, and FIG. 2 is a cross-sectional view of the rubber pad in FIG. 1 mounted on a steel track.

According to an embodiment of the present invention, as illustrated in the drawings, a rubber pad for a steel track coupled to the steel track that comprises a plurality of connected links 4 and that is provided with a bushing 110 engaging with a sprocket 1 to allow driving of equipment may include a rubber pad body 22 coupled to the outside of the link 5 and one or more foreign substance discharging grooves 26 formed on an outer surface 25 of the pad body 22 and indented in the forward or backward direction of the steel track.

The steel track is driven upon receiving power by the rotational force of the sprocket 1, and the driving parts will be described with reference to FIG. 3. The sprocket 1 is coupled to engage with the bushing 110 connecting the sprocket 1 and the links 4 to transfer power and drive the steel track forward or backward. A steel shoe is coupled to a conventional steel track. However, in the embodiment, a rubber pad 20 replaces the steel shoe and is directly coupled to the link 4, which is referred to as a chain-on type. The rubber pad 20 coupled in the chain-on type may protect the road surface during driving and working.

On the other hand, an idler 2 is installed in a front end of the steel track and the sprocket 1 is installed in a rear end of the steel track, the front and rear ends forming the circumference of the steel track, such that the idler 2 and the sprocket 1 serve to switch the rubber pad 20 portion from forward driving to backward driving or vice versa while maintaining the shape of the steel track. A pin 6 rotatably connecting the links 4 to each other is inserted into the bushing 110 engaging with the teeth of the sprocket 1 described above.

FIG. 1 shows that a foreign substance discharging groove 26 is formed on the outer surface of the pad body 22 and indented. The foreign substance discharging groove 26 is indented in the forward direction of the steel track in the drawing but is not limited thereto. The foreign substance discharging groove 26 may be indented in the backward direction of the steel track.

Foreign substances enter a space surrounded by the pad body 22, the link 4, and the bushing 110 while the steel track drives and the entering foreign substances interfere with the driving of the sprocket 1, thereby causing loss of power, overload on the power system, and early wearing of driving parts such as the bushing 110, the sprocket 1, and the like. In addition, entering foreign substances also cause early damage to the pad body 22. Accordingly, the embodiment provides the foreign substance discharging groove 26 on the outer surface of the pad body 22 to resolve the issue.

FIG. 2 shows that the clockwise rotation of the sprocket 1 moves the link 4 and the rubber pad 20 in the forward direction of the steel track to initiate the driving, and the foreign substance discharging groove 26 opens up in the forward direction in the process. Accordingly, even if foreign substances enter and are accumulated in the space surrounded by the pad body 22, the link 4, and the bushing 110, the foreign substances may be freely discharged through the open front during the driving.

In particular, the front of the foreign substance discharging groove 26 opens up rather than be hidden by the adjacent pad body 22 from the moment the pad body 22 that is in contact with the ground leaves the ground and rotates along with the sprocket 1. Accordingly, the accumulated foreign substances may be effectively discharged through the open front of the foreign substance discharging groove 26.

That is, according to the embodiment, forming the foreign substance discharging groove 26 in the pad body 22 allows forming a space through which the foreign substances may be discharged between the plurality of pad bodies 22 so that the foreign substances may be effectively discharged through the foreign substance discharging groove 26.

On the other hand, the bottom surface (26a) of the foreign substance discharging groove 26 may incline downward from the inside to the outside, and either side surface (26b) of the foreign substance discharging groove 26 may widen from the inside to the outside. Such formation of the foreign substance discharging groove 26 allows more effective discharge of the foreign substance along the inclining bottom surface (26a) and either widening side surface (26b).

Figure 3:
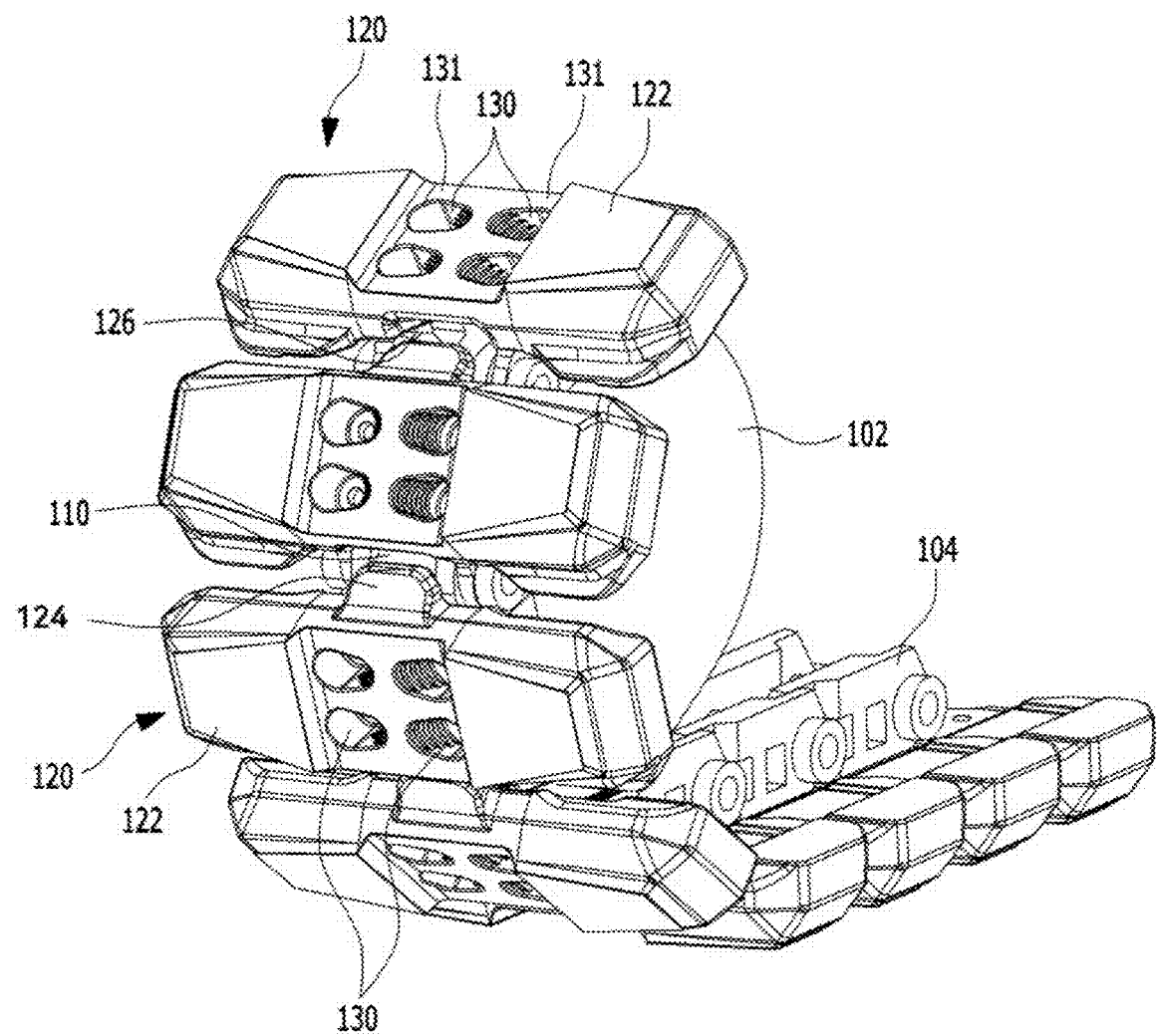
FIG. 3 is a perspective view illustrating a rubber pad mounted on a steel track according to another embodiment of the present invention.
Figure 4:
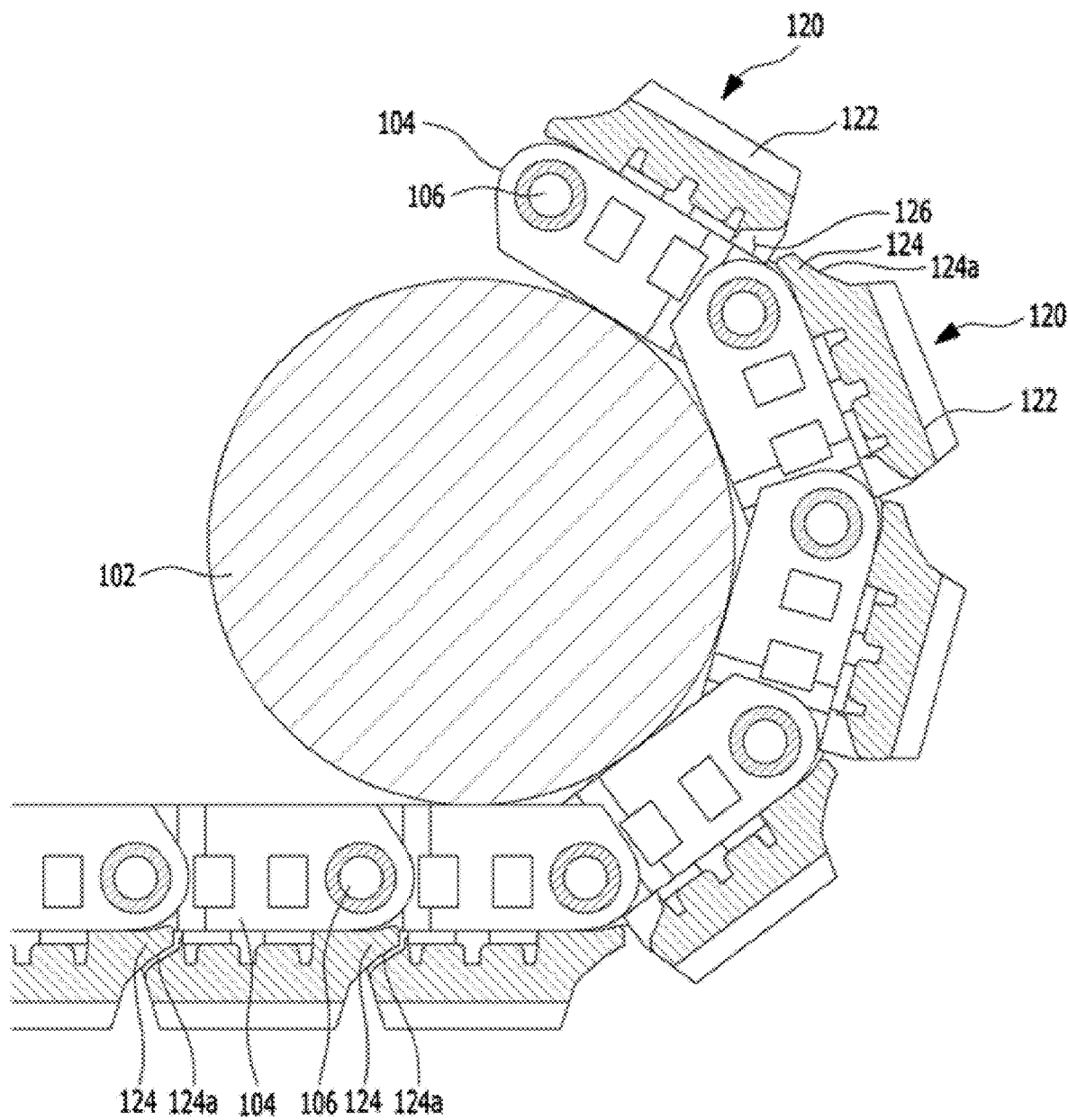
FIG. 4 is a cross-sectional view illustrating the rubber pad mounted on the steel track in FIG. 3.

FIG. 3 is a perspective view illustrating a rubber pad mounted on a steel track according to another embodiment of the present invention, and FIG. 4 is a cross-sectional view illustrating the rubber pad mounted on the steel track in FIG. 3.

The bushing 110 is hardly exposed to the outside when passing a portion where the steel track is in contact with a bottom surface. However, when passing a circumferential portion (a portion where an idler 102 is installed), as illustrated in FIG. 3, the bushing 110 is exposed to the outside as the interval between the rubber pads 120 widens, and foreign substances such as dirt or stones enter. The configuration of the rubber pad 120 to resolve the issue is as follows.

A bushing cover 124 with a predetermined thickness and width extending toward the adjacent pad body 122 is provided on the outer surface of the pad body 122 of the rubber pad 120. The bushing cover 124 may protrude from the front or rear end (with respect to the moving direction of the steel track) of the pad body 122. The bushing cover 124 is accommodated inside the foreign substance discharging groove 26 formed in the adjacent pad body 122.

When the bushing cover 124 is provided in this manner, exposure of the bushing 110 to the outside may be blocked so that damage to the bushing 110 caused by the impact from the foreign substances may be prevented and the service life of the bushing 110 may be extended. In addition, frictional wearing, noise, and vibration caused by the foreign substances entering the bushing 110 may be prevented, and mismatching between the sprocket 1 and the bushing 110 and disengagement of the steel track caused by the sticking of the foreign substances may be prevented.

The bushing cover 124 may be provided in the middle of the pad body 122 in the right/left width direction, and the width of the bushing cover 124 is preferably sufficient to cover the bushing 110. In addition, the upper surface of the bushing cover 124 preferably inclines downward toward the outside so as to be readily accommodated into the adjacent foreign substance discharging groove 126.

In addition, when the bushing cover 124 is accommodated inside the foreign substance discharging groove 126, a predetermined interval is formed between the bushing cover 124 and the foreign substance discharging groove 126. The bushing cover 124 does not remain accommodated inside the foreign substance discharging groove 126 all the time. As illustrated in FIG. 4, the bushing cover 124 is accommodated inside the foreign substance discharging groove 126 when in contact with the ground and pulls out of the foreign substance discharging groove 126 when rotating along the idler 102. The foreign substances accumulated in the foreign substance discharging groove 126 may be discharged to the outside at this time.

The selective accommodation of the bushing cover 124 inside the foreign substance discharging groove 126 over the driving section allows the formation of the interval to minimize the friction in the course of accommodation into and pulling out of the foreign substance discharging groove 126. The interval may be 3 to 10 mm in the length, width, and height directions of the pad body 122. The friction between the bushing cover 124 and the foreign substance discharging groove 126 may interfere with the smooth operation if the interval is less than 3 mm, and the bushing 110 may not be sufficiently covered if the interval exceeds 10 mm.

Figure 5:
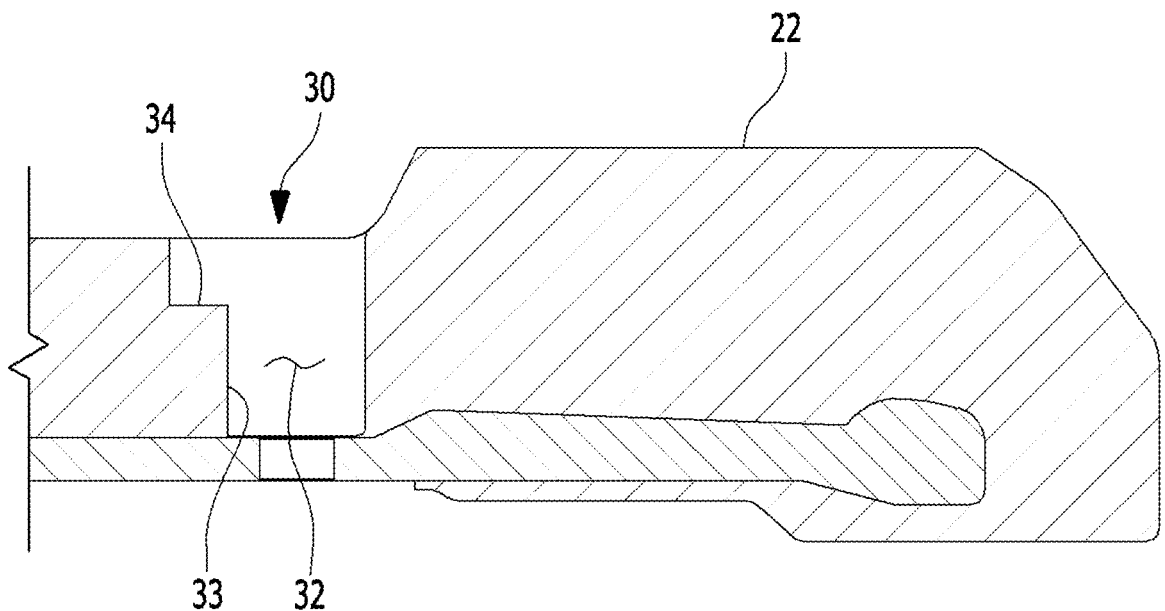
FIG. 5 is a view illustrating a fastening hole of a rubber pad.
Figure 6:
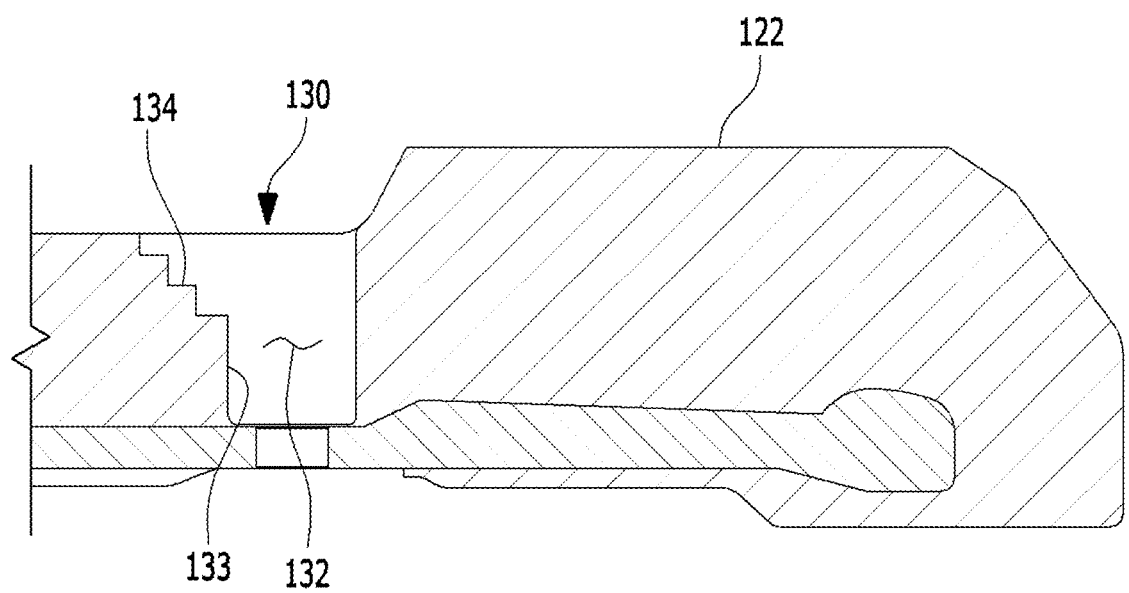
FIG. 6 is a view illustrating another example of a fastening hole of a rubber pad.
Figure 7A:
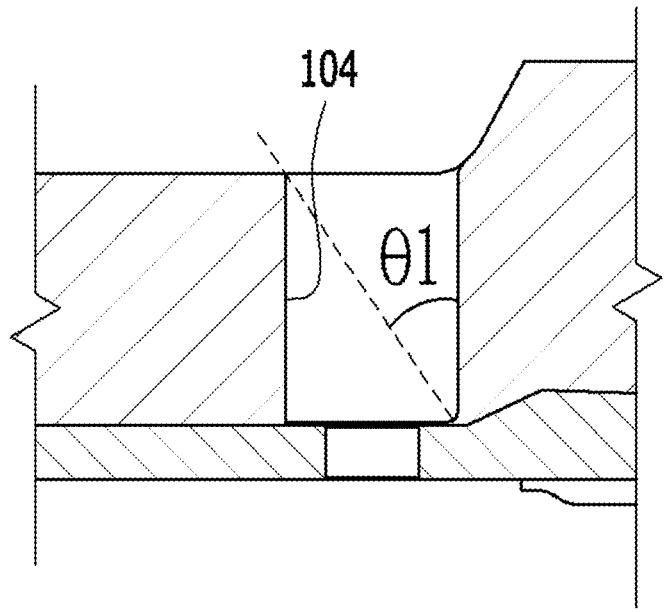
FIGS. 7A and 7B are views illustrating a comparison between the fastening hole in FIG. 6 and a conventional fastening hole.
Figure 7B:
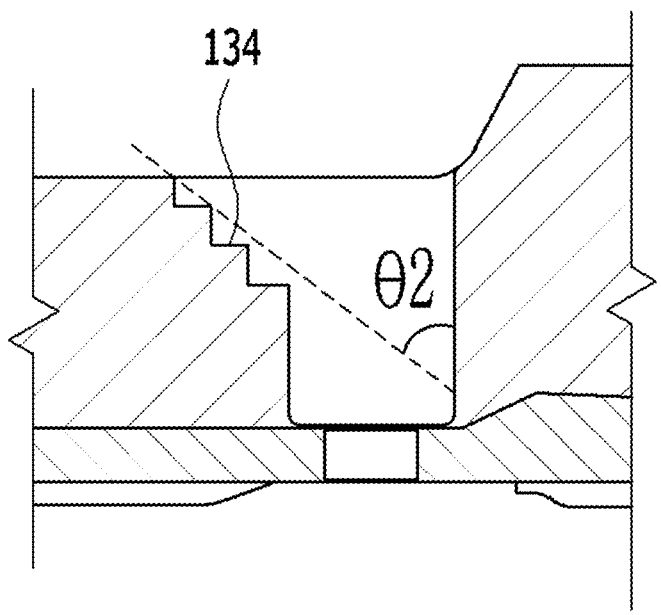

FIG. 5 is a view illustrating a fastening hole of a rubber pad, FIG. 6 is a view illustrating another example of a fastening hole of a rubber pad, FIGS. 7A and 7B are views illustrating a comparison between the fastening hole in FIG. 6 and a conventional fastening hole, and FIGS. 8A to 9B are views illustrating positions of a fastening portion constituting a fastening hole of a rubber pad.

The drawings show that a plurality of fastening holes 30, 130 for coupling the pad body 22, 122 to the steel track is formed in the middle of the pad body 22, 122. Insertion and fastening of the bolt to the sufficiently deep fastening hole 30, 130 solidly fix the pad body 22, 122 to the steel track.

A conventional fastening hole is generally formed in a cylindrical shape such that only a bolt is inserted therein, and a problem is that the foreign substances, once introduced from the ground and stuck in the fastening hole while the bolt is fastened, are not easy to remove using a tool during the replacement operation of the pad body. The embodiment of the present invention restructures the fastening hole 30, 130 and facilitates the removal of foreign substances.

FIGS. 5 and 6 show that a fastening portion 32, 132 to which the bolt is substantially fastened is formed inside the fastening hole 30, 130. The bolt may be fastened to an upper surface of the steel track through the fastening portion 32, 132. An inner surface 33, 133 of the fastening hole 30, 130 is provided with a step portion 34, 134 having one or more steps to facilitate the removal of the foreign substances stuck in the fastening hole 30, 130. The step portion 34, 134 may have one step as illustrated in FIG. 5 or a plurality of steps as illustrated in FIG. 6.

Forming the step portion 34, 134 in this manner allows an operator to obliquely insert a tool (in a skewer form) and easily remove the foreign substances stuck in an upper portion. More specifically, forming the step portion 34, 134 on the inner surface 33, 133 facilitates the insertion of a tool that needs to be inserted to remove the foreign substances and consequently facilitates separation and removal of the foreign substances. Comparison of a conventional step portion 104 illustrated in FIG. 7A and a restructured step portion 134 illustrated in FIG. 7B shows that the diagonal angle θ2 in the restructured step portion 134 is greater than the diagonal angle θ1 in the conventional step portion 104 so that the working range expands and the removal of the foreign substances is facilitated when the operator inserts a tool.

In addition, forming the step portion 34, 134 prevents stacking of the foreign substances in a lump having a certain cross-section such that the foreign substances are not stuck, and the foreign substances, even if stuck, are easily separated when an external force is applied to one side.

Figure 8A:
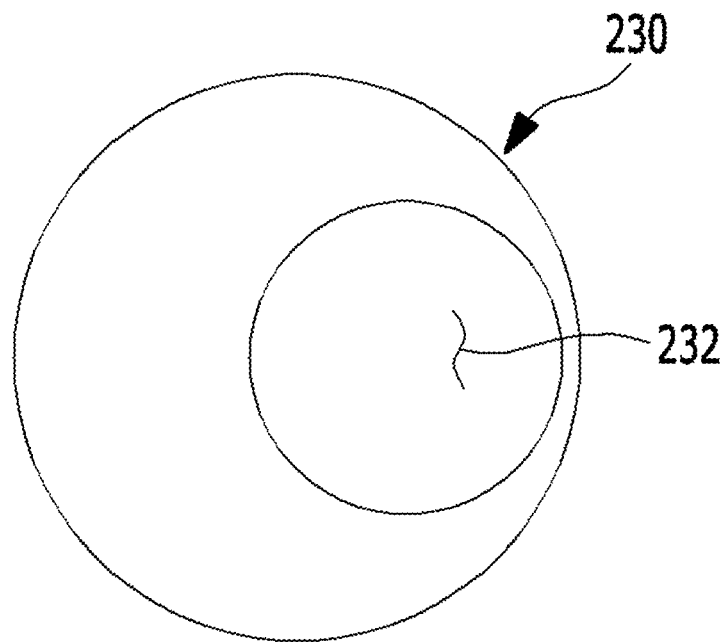
FIGS. 8A to 9B are views illustrating positions of a fastening portion constituting a fastening hole of a rubber pad.
Figure 8B:
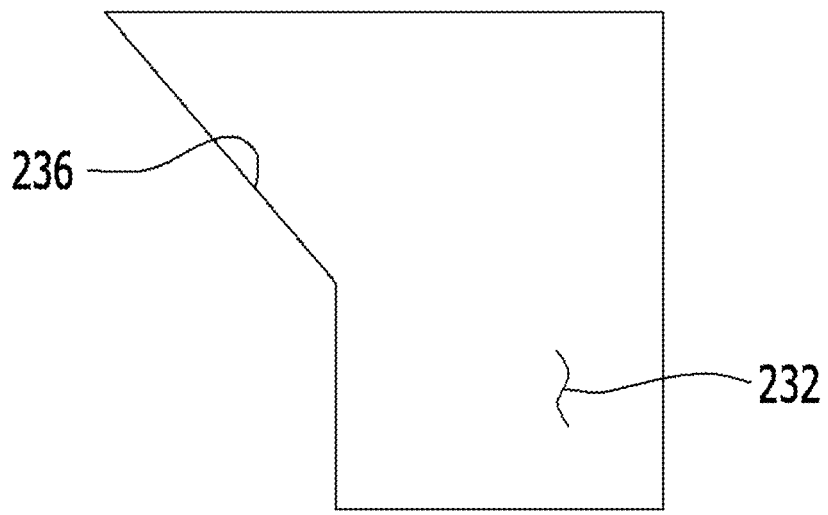

FIGS. 8A and 8B show that the fastening portion 232 formed inside the fastening hole 230 may be formed adjacent to the inner surface of the fastening hole 230 as illustrated in FIGS. 8A and 8B. At this time, an inclining surface 236 may be formed from a side end of the fastening portion 232 to the top end of the fastening hole 230 on the inner surface of the fastening hole 230.

Figure 9A:
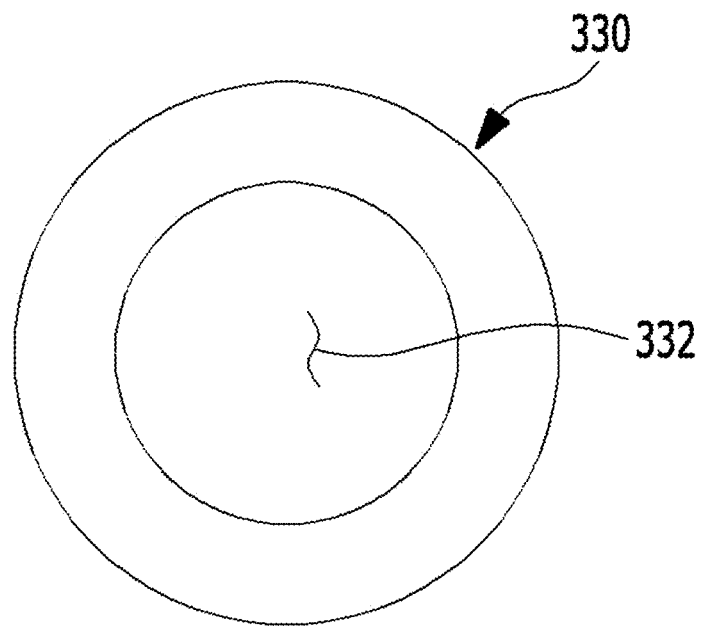
Figure 9B:
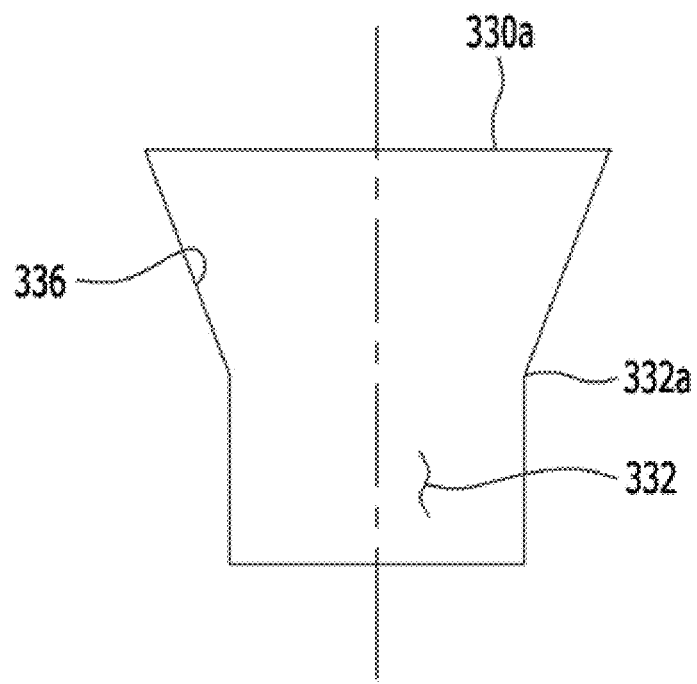

As illustrated in FIGS. 9A and 9B, the fastening portion 332 may be formed in the center inside the fastening hole 330, and an inclining surface 336 may be radially formed from the upper end 332a of the fastening portion 332 to the upper end 330a of the fastening hole 330. Forming the inclining surface 336 inside the fastening hole 330 facilitates the removal of the stuck foreign substances like the step portion 34, 134 described above does.

Figure 10:
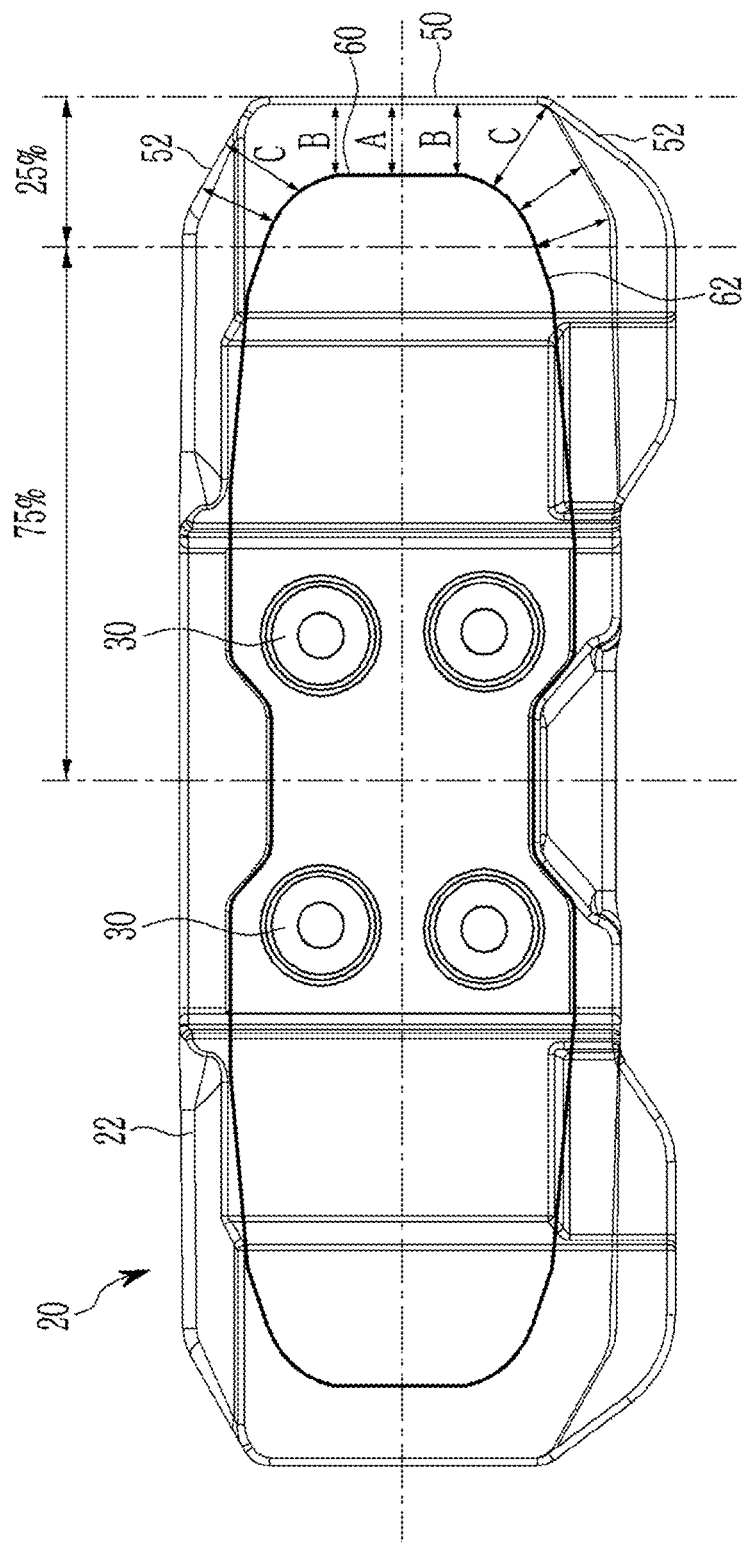
FIG. 10 is a plan view specifically illustrating a shape of a rubber pad according to an embodiment of the present invention.
Figure 11A:
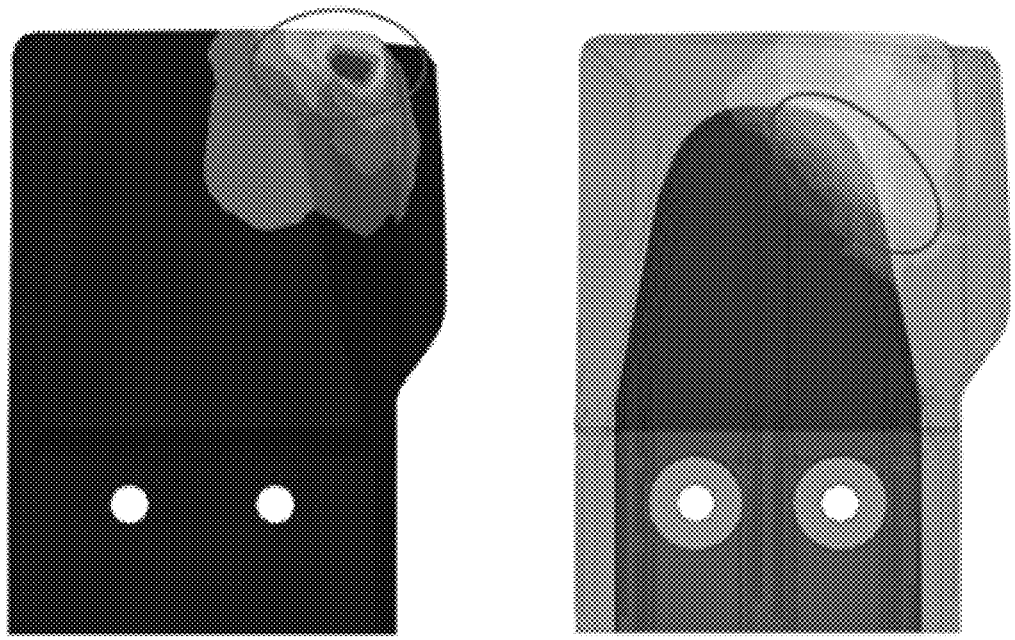
FIGS. 11A-11B are views illustrating a comparison of the strain of the rubber pad in FIG. 10 and a conventional rubber pad caused by an external force.
Figure 11B:
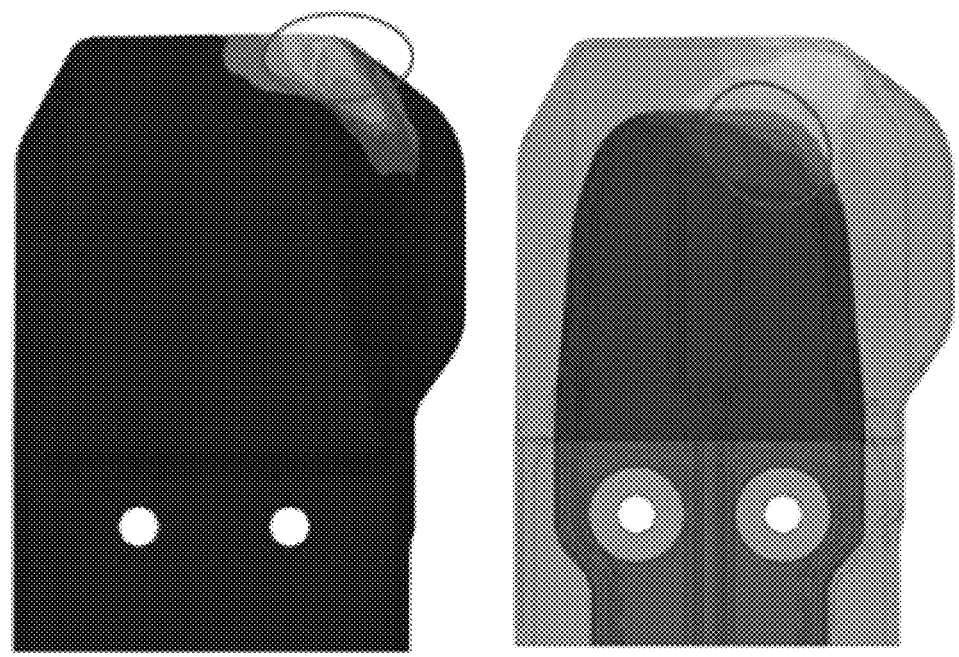

FIG. 10 is a plan view specifically illustrating a shape of a rubber pad according to an embodiment of the present invention, and FIGS. 11A-11B are views illustrating a comparison of the strain of the rubber pad in FIG. 10 and a conventional rubber pad caused by an external force.

FIG. 10 shows that, according to an embodiment of the present invention, the rubber pad may include a rubber pad body 22 coupled to the outside of the link 5 and an iron core 28 provided inside the pad body 22 in the right/left width direction. And, either end of the pad body 22 may be provided with a pad end surface 50 formed in the driving direction of the steel track and a pad inclining surface 52 inclining from the front and rear ends of the pad end surface 50 toward the middle of the pad body.

In FIG. 10, the portion corresponding to 25% of the distance from one end to the center of the pad body 22 in the right/left direction is defined as the end of the pad body 22. The pad end surface 50 is an end of the pad body 22 on either side and is a cross-section extending in the driving direction (up/down direction in the drawing) of the steel track. And the pad inclining surface 52 is a cross-section inclining at the front and rear ends of the pad end surface 50. In addition, either end of the iron core 28 provided inside the pad body 22 may include an iron core end surface 60 extending in parallel with the pad end surface 50 at a first interval B and an iron core inclining surface 62 extending in parallel with the pad inclining surface 52 at a second interval C.

Forming the ends of the pad body 22 and the iron core 28 on either side as described above has the effect of reducing strain caused by an external force, compared to the related art. FIG. 11A shows that either end of the conventional pad body 22 is formed in a rectangular shape without an inclining portion and the strain caused by an external force is approximately 29%. However, FIG. 11B shows that either end of the restructured pad body 22 has the pad inclining surface 52 and the iron core inclining surface 62 so that the substantial strength of the rubber is maintained and the strain caused by an external force turned out to be approximately 21%. That is, the strain of the restructured pad body 22 is reduced by approximately 30% compared to the conventional pad body 22 so that damage (edge-cut) to the tread rubber may be prevented, and also forming inclining surfaces 52, 62 at the respective corners of the pad body 22 facilitates discharge of the foreign substances, cleaning, and maintenance.

FIG. 10 also shows that the first interval B and the second interval C are 0.5 to 1.5 times the intervals between the pad end surface 50 and the iron core end surface 60 formed along the centerline with respect to the driving direction (the midline with respect to the right/left direction in the drawing) of the pad body 22. The benefit of rubber such as cushioning, ground protection, and the like diminishes when the first interval B and the second interval C are less than 0.5 times the interval between the pad end surface and the iron core end surface, and rolling and the like destabilize the support for the equipment, and the side lifting capacity diminishes in the case of excavators and cranes in particular when the intervals exceed 1.5 times the interval between the pad end surface and the iron core end surface.

Specific embodiments of the present invention are described, but those with common skills in the art will understand that the present invention may be variously modified and altered without deviating from the spirit and scope of the present invention described in the claims below.

DESCRIPTION OF REFERENCE NUMERALS

| | |
|---|---|
| 1: sprocket | 2, 102: idler |
| 4: link | 6: pin |
| 10, 110: bushing | 20, 120: rubber pad |
| 22, 122: pad body | 24, 124: bushing cover |
| 26, 126: foreign substance discharging groove | |
| 28: iron core | 30, 130, 230, 330: fastening hole |
| 32, 132, 232, 332: fastening portion | 34, 134: step portion |
| 236, 336: inclining surface | 40: reinforcing member |
| 50: pad end surface | 52: pad inclining surface |
| 60: iron core end surface | |
| 62: iron core inclining surface | |

What is claimed is:

1. A rubber pad for a steel track, coupled to the steel track including a plurality of links and provided with a bushing engaging with a sprocket to allow driving of equipment, the rubber pad comprising:
 a rubber pad body configured to be coupled to an outside of one of the plurality of the links; and
 a foreign substance discharging groove disposed on a first outer surface of the rubber pad body and indented toward a center of the rubber pad body,
 wherein a bottom surface of the foreign substance discharging groove inclines downward from an inner side to an outer side of the rubber pad body, and either side surface of the foreign substance discharging groove widens from inside to outside, and wherein a bushing cover is disposed on the rubber pad body and is positioned to face a foreign substance discharging groove of an adjacent rubber pad such that at least a portion of the bushing cover is configured to be accommodated inside the foreign substance discharging groove of the adjacent rubber pad.

2. The rubber pad for the steel track of claim 1, wherein the rubber pad body includes fastening holes into which bolts for coupling the rubber pad to the one of the plurality of the links are fastened, and a length of the foreign substance discharging groove in a width direction of the rubber pad body is equal to or less than a distance in the width direction between the fastening holes.

3. The rubber pad for the steel track of claim 1, wherein the bushing cover extends from a second outer surface of the rubber pad body toward the adjacent rubber pad to shield the bushing from the outside.

4. The rubber pad for the steel track of claim 3, wherein the bushing cover is provided at either a front end or a rear end of the rubber pad body with respect to a driving direction of the steel track.

5. The rubber pad for the steel track of claim 3, wherein a lower surface of the bushing cover inclines upward from the rubber pad body toward the outside.

6. The rubber pad for the steel track of claim 1, wherein an interval is formed between the bushing cover of the rubber pad body and the foreign substance discharging groove of the adjacent rubber pad when the bushing cover of the rubber pad body is accommodated inside the foreign substance discharging groove of the adjacent rubber pad, and wherein the interval is 3 to 10 mm in each of a length, a width, and a height directions of the rubber pad body.

7. A rubber pad for a steel track, coupled to the steel track including a plurality of links and provided with a bushing engaging with a sprocket to allow driving of equipment, the rubber pad comprising
  a rubber pad body configured to be coupled to an outside of one of the plurality of the links;
  a fastening hole disposed in the rubber pad body to receive a bolt for coupling the rubber pad to the one of the plurality of the links; and
  a foreign substance discharging groove disposed on a first outer surface of the rubber pad body and indented toward a center of the rubber pad body,
  wherein the fastening hole includes a fastening portion to which the bolt is fastened, a step portion disposed on an inner surface of the fastening hole, or an inclining surface connecting an upper end of the fastening portion to an upper end of the fastening hole,
  wherein the step portion comprises one or more steps configured to facilitate removal of foreign substances stuck in the fastening hole,
  wherein the inclining surface radially extends from the upper end of the fastening portion to the upper end of the fastening hole,
  wherein a bottom surface of the foreign substance discharging groove inclines downward from an inner side to an outer side of the rubber pad body, and either side surface of the foreign substance discharging groove widens from inside to outside, and
  wherein a bushing cover is disposed on the rubber pad body and is positioned to face a foreign substance discharging groove of an adjacent rubber pad such that at least a portion of the bushing cover is configured to be accommodated inside the foreign substance discharging groove of the adjacent rubber pad.

8. The rubber pad for the steel track of claim 7, wherein the fastening portion formed inside the fastening hole is formed adjacent to the inner surface of the fastening hole.

9. The rubber pad for the steel track of claim 8, wherein the fastening portion is formed in a middle of the fastening hole.

10. A rubber pad for a steel track, coupled to the steel track including a plurality of links and provided with a bushing engaging with a sprocket to allow driving of equipment, the rubber pad comprising:
  a rubber pad body configured to be coupled to an outside of one of the plurality of the links;
  an iron core provided inside the rubber pad body in a right/left width direction of the rubber pad body; and
  a foreign substance discharging groove disposed on a first outer surface of the rubber pad body and indented toward a center of the rubber pad body,
  wherein either end of the rubber pad body is provided with a rubber pad end surface formed in a driving direction of the steel track and a rubber pad inclining surface inclined from front and rear ends of the rubber pad end surface toward a middle of the rubber pad body,
  wherein either end of the iron core includes an iron core end surface extending in parallel with the rubber pad end surface at a first interval and an iron core inclining surface extending in parallel with the rubber pad inclining surface at a second interval, and
  wherein the first and second intervals are 0.5 to 1.5 times a distance between the rubber pad end surface and the iron core end surface disposed in a driving direction of the rubber pad body,
  wherein a bottom surface of the foreign substance discharging groove inclines downward from an inner side to an outer side of the rubber pad body, and either side surface of the foreign substance discharging groove widens from inside to outside, and
  wherein a bushing cover is disposed on the rubber pad body and is positioned to face a foreign substance discharging groove of an adjacent rubber pad such that at least a portion of the bushing cover is configured to be accommodated inside the foreign substance discharging groove of the adjacent rubber pad.

* * * * *